AUTOMATIC LEVEL-ADJUSTMENT CIRCUIT

Filed April 27, 1962

EDWARD S. SEELEY
INVENTOR.

BY Lyon & Lyon
ATTORNEYS.

United States Patent Office 3,133,990
Patented May 19, 1964

3,133,990

AUTOMATIC LEVEL-ADJUSTMENT CIRCUIT

Edward S. Seeley, Santa Ana, Calif., assignor to Altec Lansing Corporation, Anaheim, Calif., a corporation of Delaware Filed Apr. 27, 1962, Ser. No. 190,700
9 Claims. (Cl. 179—1)

This invention relates to public-address systems and, more particularly, to an improved circuit for automatically adjusting the gain of such systems to compensate for ambient noise levels.

One of the problems of operating a paging or public-address system is that of controlling the level of the sound output so that it will be intelligible over the ambient noise. This is not too great a problem where the gain or amplification of this system is under the control of a human operator, as is the case in theaters and the like. However, most public-address systems are unattended for economic reasons, and, in installations such as factories or airports, where the loudspeakers are scattered over a considerable area and where ambient noise levels vary differently at different locations, the use of a human monitor becomes impossible. Attempts have been made to solve this problem by placing what is termed a noise-sampling microphone and amplifier in the vicinity of a loudspeaker, so that, as the noise level increases, the gain of an amplifier, which drives the loudspeaker, will be increased.

The trouble with a system of this type is that, in order to be effective, the noise microphone must be in the vicinity serviced by the loudspeaker being driven. As a result, the loudspeaker output is added to the noise level. The noise microphone detects this and increases the gain of the amplifier driving the loudspeaker to compensate. This, in turn, causes an increase in the sound level detected by the noise microphone, with consequent increase in gain of the amplifier driving the loudspeaker.

Because such systems are impractical as long as the noise microphone has to be in the vicinity of the loudspeaker being controlled, it has been the custom to set the gain of the system so that the loudspeaker sound output will be intelligible for most noise levels encountered. For noise levels encountered, for example, by the starting up and operation of an aircraft motor, the sound is unintelligible, and, during periods of low-noise level, the announcements tend to be uncomfortably loud.

It is an object of the present invention to provide an automatic-gain-control system for paging or background-music systems, which can control the gain of the system without a runaway condition of the type described resulting.

Another object of the present invention is to provide an automatic-gain-control circuit for paging systems which can effectively control the gain of the paging system in accordance with the requirements of the ambient noise level.

Yet another object of the present invention is the provision of a novel and useful automatic-gain-control system for a paging system which responds to the ambient noise level in the vicinity of the location at which the loudspeakers of the paging system are placed.

These and other objects of the invention may be achieved by providing an arrangement wherein, at the time that a voice input is applied to the paging system, the automatic-gain-control feature, which responds to the ambient noise level, is locked up in its then-existing condition. As soon as the voice input to the system is terminated, the automatic-gain-control circuit is released to operate normally to vary the gain of the system in accordance with the ambient noise level at the location desired to be monitored. Thus, in operation, assume that an announcement is made. Despite any changes in ambient noise level, no change in the gain of the system occurs while the announcement is being made. Shortly after the announcement is terminated, the gain of the system is again altered, in accordance with the ambient noise. To insure intelligibility of the announcement, it may be repeated. However, it should be noted that the sound from the paging loudspeaker is not added to the ambient noise level to be detected by the noise mircophone, whereby heretofore a runaway condition would occur.

The novel features that are considered characteristic of this invention are set forth with particularly in the appended claims. The invention itself, both as to its organization and method of operation, as well as additional objects and advantages thereof, will best be understood from the following description when read in connection with the accompanying drawings, in which:

Figure 1:
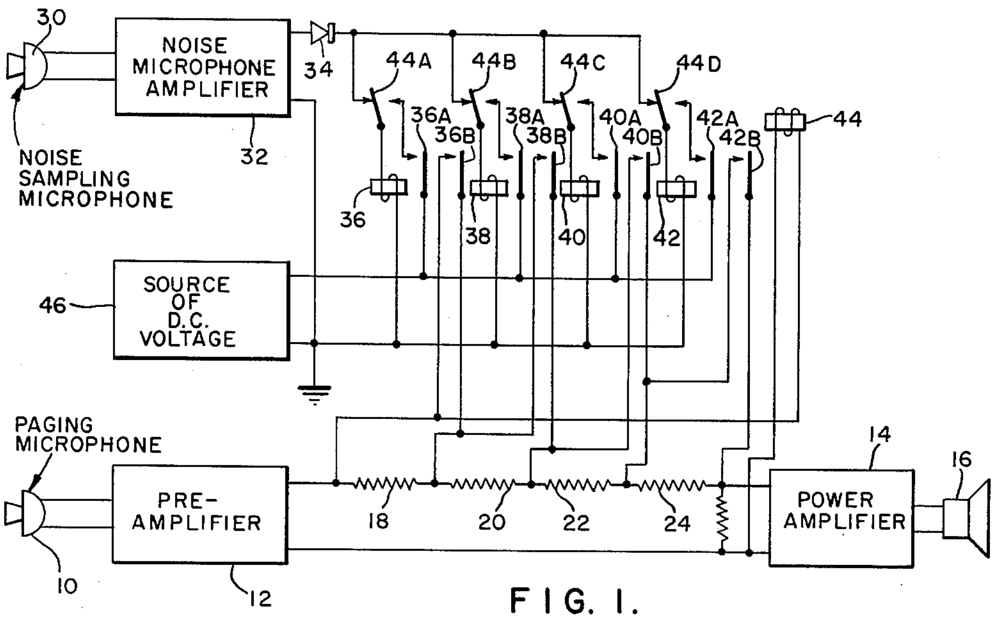
FIGURE 1 is a circuit diagram of one embodiment of the invention.

FIGURE 1 is a circuit diagram of one embodiment of the invention, showing its inclusion together with a paging system. The paging system will include a paging microphone 10, the output of which is applied to a paging preamplifier 12. The paging preamplifier 12 is connected to a paging power amplifier 14, which drives a loudspeaker 16 at the location where the sound is desired. The paging amplifier 12 is connected to the paging power amplifier 14 through a plurality of series-connected resistors, effectively 18, 20, 22, 24. These resistors serve to attenuate the signal applied from the paging amplifier 12 to the paging power amplifier 14. By means of relays, the resistors are shorted out of the connection between the two amplifiers in order to increase the signal which drives the power amplifier when it is required to increase the sound output of the speaker 16 in accordance with the noise level in its vicinity.

In accordance with this invention, a noise-sampling microphone 30, which is placed in the region where it is desired to sample the ambient noise level, applies its output to drive a noise microphone amplifier 32. The amplified noise signal is rectified by a rectifier 34. The output of the rectifier is applied to the solenoid windings of a plurality of gain-control relays, respectively 36, 38, 40, 42. These gain-control relays have different sensitivities, or respond to different levels of current applied thereto, for reasons which will become more clear as this explanation progresses.

Each one of the relays 36, 38, 40, and 42 has two normally open, single-pole, single-throw contact pairs, respectively 36A, 36B, 38A, 38B, 40A, 40B, and 42A, 42B. Each one of the respectively normally open contact pairs 36B, 38B, 40B, and 42B are connected across the respective resistors 18, 20, 22, and 24, so that when these contacts are closed they short out, or bypass, these resistors. Thus, assuming that a first noise level were detected by the noise-sampling microphone, the current output of the noise microphone amplifier would be just sufficient to operate relay 36, and not any of the other relays. As a result, contact pairs 36B would be closed, whereby resistor 18 would be removed from the coupling between the output of paging amplifier 12 and the power amplifier 14. Further, successive increases in noise detected by the noise-sampling microphone can cause further successive increases in the current output of the noise microphone amplifier, with resultant operation of the succeeding relays 38, 40, 42, which are successively less sensitive to the current applied to them in order to insure this successive operation with increase in current.

In accordance with this invention, an additional relay 44 is provided, which has a single-pole, double-throw pair of contacts, respectively 44A, 44B, 44C, and 44D, for each one of the automatic-gain-control relays 36, 38, 40, and 42, which are used in the paging system. The relay coil of the relay 44 is connected across the output of the paging amplifier 12, in order that relay 44 be operated whenever the paging amplifier produces an output in response to an audio signal being applied to the paging microphone 10. The normally closed portion of the single-pole, double-throw contacts 44A, 44B, 44C, and 44D are connected in series with the respective windings of the relays 36, 38, 40, and 42, so that energizing current for these windings must flow through these contacts. The remaining contact, or normally open contact, of the single-pole, double-throw contacts 44A, 44B, 44C, and 44D are respectively connected in series with the single-pole, normally open contact pairs, respectively 36A, 38A, 40A, and 42A. There is also provided a D.C. voltage source 46. One output terminal of the noise microphone amplifier 32, the one not connected to the normally closed contacts of the contact pairs 44A, 44B, 44C, and 44D, is connected to the ground terminal of the source of D.C. voltage. As may be seen from the diagram, the side of the respective windings of the relays 36, 38, 40, and 42, which is not connected to the common contact of the contact pairs 44A, 44B, 44C, and 44D, is connected to the ground output terminal of the D.C. voltage source 46. Also, the contacts 36A, 38A, 40A, and 42A are connected to the high-potential side of the source of D.C. voltage 46.

The relay 44 is of a well-known type, which operate rapidly but are slow to release. Now, considering the operation of the system shown in FIGURE 1 as a whole, let it be assumed that none of the relays 36, 38, 40, or 42 are operated, whereby all of the attenuating resistors 18 through 24 are in the circuit. Assume, now, that an announcement is made. As soon as the announcement is comenced, the output of the paging amplifier 12 causes the relay 44 to become operative, whereby it causes the common contact of the single-pole, double-throw contact pairs 44A through 44D to be operated to connect one end of the respective relay coils 36 through 42 to one of the contacts of the normally open contact pairs 36A, 38A, 40A, and 42A. Should any increase in the ambient sound occur while the paging system is in use, since the output of the noise microphone amplifier is effectively disconnected from the relays 36, 38, 40, and 42, no increase in the gain of the paging system can occur. However, upon the termination of the announcement, or where a sufficient pause occurs during the announcement, the slow-to-release relay 44 becomes inoperative, whereby one or more of the relays 36, 38, 40, and 42 can become operated in response to the output of the noise microphone amplifier, to increase the sound output of the paging system to compensate for the increase in the ambient noise.

Assume, now, that the next announcement is made, which occurs before the ambient noise has died down and the operated ones of the relays 36 through 42 have been released, then, as soon as an output is provided by the paging amplifier 12, relay 44 is again operated. This time, in view of the fact that one or more of the relays 36 through 42 are operated, the contact pairs of these relays, respectively 36A through 42A, are closed, whereby voltage for maintaining these relays operated is provided from the output of the D.C. voltage source 46 through a path including the now-closed, normally open contacts of the relays and the operated closed closed contacts of the relay 44. Accordingly, the sound output of the paging system is maintained as it was at the time the announcement was commenced and is maintained during the interval of the announcement. At a time shortly after the termination of the announcement or where a sufficient pause occurs during the announcement, as determined by the time required by the relay 44 to become inoperative, the automatic-control portion of the paging system can orient itself to the new ambient noise conditions.

Figure 2:
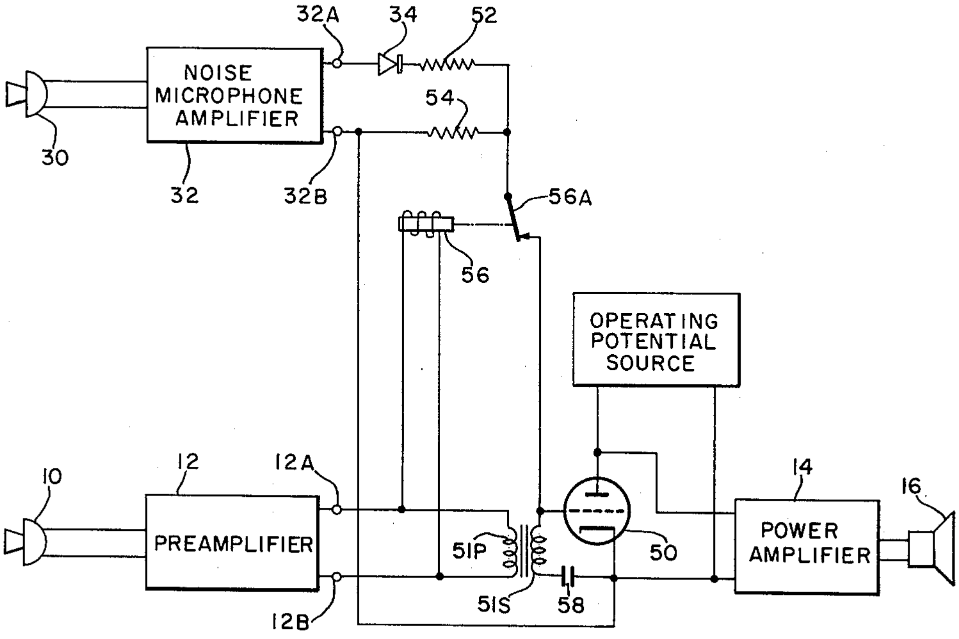
FIGURE 2 is a circuit diagram of another embodiment of the invention.

Reference is now made to FIGURE 2, which shows another embodiment of the invention for use with a system wherein variation of the sound output is achieved by a variable mu tube 50, having the property that its gain is a function of the D.C. applied to its grid. The apparatus in FIGURE 2, which is given the identical numeral as apparatus in FIGURE 1, is substantially identical apparatus and operates substantially in the identical pattern. Thus, the output of the noise microphone 30 is amplified by the noise amplifier 32 and rectified by the diode 34. The amplifier 32 has two output terminals, respectively 32A and 32B. The amplifier 12 has two output terminals, respectively 12A and 12B. These terminals 12A, 12B are connected to the primary winding 51P of a transformer. One end of the secondary winding 51S of the transformer is connected to the control grid of the variable mu tube 50. The other end of the secondary winding is connected to a capacitor 58.

The rectifier 34 is connected between the terminal 32A and a resistor 52. A resistor 54 is connected between the resistor 52 and terminal 32B. The junction of resistors 52 and 54 are connected to the normally closed contacts 56A of a relay 56. The normally closed contacts 56A are connected between the junction of the resistors 52 and 54 and the end of the secondary winding 51S connected to the control grid of tube 58. The winding of relay 56 is connected across terminals 12A and 12B to be energized by the occurrence of any output from the amplifier 12.

The capacitor 58 is connected between the secondary winding 51S and the cathode of the tube 50. The terminal 32B is connected to the side of capacitor 58, which is connected to the cathode of the tube 50. The output from the tube 50 is applied to the input of the power amplifier 14. An operating-potential source 60 supplies operating power to the tube 50.

When the microphone 10 is not in use for paging or an announcement, the relay 56 is inoperative, and its contacts 56A are closed. The microphone 30 detects the ambient noise level. This is amplified, rectified, and applied to the control grid of tube 50 as a D.C. bias. When the microphone 10 is used for an announcement, an output is obtained from the amplifier 12. This causes the relay 56 to become operative, opening the contacts 56A. The capacitor 58 holds the voltage level substantially at the value which was present just before the relay 56 became operative. Thus, there will be substantially no change in the sound level over a reasonable time or for reasonable length announcements. The relay 56 is also a fast-operate, slow-to-release type. Accordingly, shortly after the announcement is terminated, the contacts 56A will close, and the gain of the system can again be varied to compensate for changes in ambient noise level.

The reason for delaying the reactivation of the gain-control portion of the system is to insure that the sound output of the speaker 16 has been reduced sufficiently not to enter into the control function of the noise microphone and amplification system. Otherwise, the gain may be set too high for an immediately following announcement. The delay may be performed in a number of ways other than a fast-operate, slow-release relay, such as by use of a sufficient acoustical separation, or by the inclusion of well-known electrical-delay elements in the circuit. Although the circuit has been shown employing a relay which is believed to be the most inexpensive way of constructing an effective circuit, these devices may be replaced by their vacuum tube or solid-state equivalents without departing from the spirit and scope of this invention. The resistors 18, 20, 22, and 24, which are indicated as simple resistances, may also be loss-pads or other networks for producing attenuation of the single level in the paging system, while maintaining impedance values.

There has been described and shown hereinabove a novel, useful, and practical system for automatically controlling the gain of a paging system, or public-address system, of the type wherein it is desired that the gain of the system be varied to compensate for the ambient level of sound in the vicinity of the loudspeakers employed in the system.

I claim:

1. In a sound-amplification system of the type wherein the sound is amplified and reproduced by a loudspeaker and there is included apparatus for compensating for the ambient noise level in the vicinity of said speaker including means for detecting the noise and producing a control signal in response thereto, and gain control means for varying the sound output in response to said control signal to compensate for said ambient noise level, the improvement comprising means for detecting when said sound system is being used for sound amplification and to produce a control effect responsive thereto, and controlled means to maintain said gain control means in the state it had just prior to the commencement of the use of said system for amplifying sound, said controlled means also including means to maintain said gain control means not responsive to control signals while said sound system is being used for amplifying sound.

2. In an announcing system of the type wherein sound is amplified by an amplifier and thereafter reproduced by a loudspeaker connected to said amplifier, and wherein there is a system for detecting the ambient noise level in the vicinity of said loudspeaker and for producing a control signal representative thereof and wherein said system includes gain control means for varying the gain of said sound system in response to said control signal to compensate for the noise in the vicinity of said loudspeaker, the improvement comprising means for generating a relay operating signal responsive to said sound system amplifying sound, relay means, means for operating said relay means responsive to said relay operating signal, first contact means responsive to said relay means being rendered operative for maintaining said gain control means in a condition such that the gain of said system is at the level it had just prior to said system being employed for amplifying sound, and second contact means responsive to said relay means being rendered operative for maintaining said gain control means unresponsive to variations in said control signal.

3. In a noise-operated automatic-level adjustment announcing system of the type wherein a voice signal is amplified by a preamplifier, the output of which is coupled to a power amplifier which in turn drives a loudspeaker, and wherein there is apparatus for detecting the ambient noise level in the vicinity of said loudspeaker and for providing a control signal indicative thereof there is included in the coupling between said preamplifier and power amplifier means for varying the amplitude of the signal applied to said power amplifier from said preamplifier in response to said control signal to compensate for the noise level in the vicinity of said loudspeaker, the improvement comprising relay means having a winding connected to the output of said preamplifier for being energized when said preamplifier provides an output signal, contact means responsive to said relay means being operative to prevent further response to said control signal of said means for varying the amplitude of the signal applied by said preamplifier to said power amplifier, and means coupled to the input of said power amplifier for maintaining the amplitude of the signal applied to said power amplifier by said preamplifier at the level which it had before said relay means became operative.

4. A noise-operated automatic-level adjustment system of the type wherein a preamplifier applies sound signals to a power amplifier which in turn drives a loudspeaker, means for controlling the output of said loudspeaker to compensate for noise in the vicinity thereof comprising means for detecting the noise level in the vicinity of said loudspeaker and providing a signal indicative thereof, gain control means to which said control signal is applied for controlling the amplitude of the signal applied by said preamplifier to said power amplifier responsive to said control signal, relay means connected to the output of said preamplifier for being rendered operative in the presence of a signal at said pre-amplifier output, means responsive to said relay means being rendered operative for preventing said control signal from controlling said gain control means, and means responsive to operation of said relay means for maintaining said gain control means such that the level of the signal applied from said preamplifier to said power amplifier remains at the value which it had prior to said relay means becoming operative.

5. In a paging system of the type wherein sound signals are amplified in a preamplifier, the output of which is coupled to the input of a power amplifier, the output of which drives a loudspeaker, means for compensating for the ambient noise level in the vicinity of said loudspeaker comprising means for detecting said noise level and producing a control signal representative thereof, a plurality of attenuators, means connecting said plurality of attenuators in series with each other, means coupling the output of said preamplifier to the input of said power amplifier with said series-connected plurality of attenuators, a separate first relay means associated with each of said plurality of attenuators, each of said first relay means including means for bypassing its associated attenuator when said first relay means is rendered operative, means for applying said control signal to said first relay means to render them operative selectively to compensate for the ambient noise level in the vicinity of said speaker, and second relay means connected to the output of said preamplifier to be operated in the presence of an output therefrom, said second relay means including first contact means operative in response to said second relay becoming operated to render said means to apply a control signal to said plurality of first relay means inoperative, and second contact means operative in response to said second relay becoming operative to maintain operative those of said first relay means which are operated at that time.

6. In a paging system of the type wherein sound signals are amplified in a preamplifier, the output of which is coupled to the input of a power amplifier, the output of which drives a loudspeaker, means for compensating for the ambient noise level in the vicinity of said loudspeaker comprising means for detecting said noise level and producing a control signal representative thereof, a plurality of attenuators, means connecting said plurality of attenuators in series with each other, means coupling the output of said preamplifier to the input of said power amplifier with said series-connected plurality of attenuators, a separate first relay for and associated with each of said plurality of attenuators each said first relay having a relay coil and a first and second pair of normally open contacts, a second relay having a relay coil and a separate single-pole, double-throw contact pair for and associated with each of said plurality of first relays, each said single-pole double-throw contact pair including a common contact, a first contact with which said common contact is normally closed and a second contact with which said common contact is normally open, means connecting the common contact of each single-pole double-throw contact pair to one end of the associated first relay coil, means to apply said control signal to all of said first contacts and to the other ends of said first relay coils to cause them to be selectively energized in response thereto, means connecting a first contact pair across its associated attenuator to bypass said attenuator when operated, a source of operating potential for said first relays, means connecting each said second contact to one contact of its associated second contact pair, means connecting said source of operating potential to the other contacts of all said second contact pairs and to the other ends of the relay coils of all said first relays, and means for connecting said second relay coil to the output of said preamplifier whereby said first relays are disconnected from said control signals when said second relay is operative and those of said first relays which are operative at that time are connected to said source of operating potential to be maintained operated.

7. A system for producing sound signals with a loudspeaker comprising an amplifier having an output connected to drive said loudspeaker and an input to which said sound signals are applied, means for compensating for ambient noise level in the vicinity of said loudspeaker including means for detecting the noise and producing a control signal in response thereto, gain control means for varying the amplitude of the sound signal applied to said amplifier input in response to said control signal to compensate for said ambient noise level, means for detecting when said sound system is being used for amplifying sound signals and to produce a control effect in response thereto, controlled means responsive to said control effect for maintaining said gain control means in the state it had just prior to the commencement of the use of said system for amplifying sound signals, said controlled means also including means to maintain said gain control means unresponsive to control signals which said sound system is being used for amplifying said sound signals.

8. An announcing system for reproducing sound signals with a loudspeaker comprising an amplifier having an output connected to drive said loudspeaker and an input to which said sound signals are applied, means for detecting an ambient noise level in the vicinity of said loudspeaker and for producing a control signal representative thereof, gain control means for varying the gain of the signals applied to the input of said amplifier in response to said control signals to compensate for the noise in the vicinity of said loudspeaker, means for generating a relay operating signal responsive to the application of said sound signals through the said amplifier input, relay means operated in response to said relay operating signal, first contact means responsive to said relay means being rendered operative for maintaining said gain control means in a condition such that the gain of said system is at the level it had just prior to said system being employed for amplifying sound, and second contact means responsive to said relay means being rendered operative for maintaining said gain control means unresponsive to variations in said control signals.

9. In a noise operated automatic level adjustment announcing system of the type wherein a voice signal is reproduced by a loudspeaker, a preamplifier having an input and an output means for applying said voice signals to said preamplifier input, a power amplifier having an input coupled to said preamplifier output and an output coupled to drive said loudspeaker, means for detecting the ambient noise level in the vicinity of said loudspeaker and for providing a control signal indicative thereof, means in the coupling between preamplifier and power amplifier for varying the amplitude of the signal applied to said power amplifier from said preamplifier in response to said control signal to compensate for the noise level in the vicinity of said loudspeaker, relay means having a winding connected to the output of said preamplifier for being energized when said preamplifier provides an output signal, contact means responsive to said relay means being operative to prevent further response to said control signal of said means for varying the amplitude of the signal applied by said preamplifier to said power amplifier, and means coupled to the input of said power amplifier for maintaining the amplitude of the signal applied to said power amplifier by said preamplifier at the level which it had before said relay means became operative.

References Cited in the file of this patent

UNITED STATES PATENTS 2,462,532 Morris ---------- Feb. 22, 1949
2,466,216 Ekstrand ---------- Apr. 5, 1949